(12) United States Patent
Takahashi

(10) Patent No.: US 10,604,155 B2
(45) Date of Patent: Mar. 31, 2020

(54) DRIVING ASSISTANCE DEVICE

(71) Applicant: HONDA MOTOR CO., LTD., Minato-ku, Tokyo (JP)

(72) Inventor: Naoki Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/510,442

(22) PCT Filed: May 8, 2015

(86) PCT No.: PCT/JP2015/063298
§ 371 (c)(1),
(2) Date: Mar. 10, 2017

(87) PCT Pub. No.: WO2016/038931
PCT Pub. Date: Mar. 17, 2016

(65) Prior Publication Data
US 2017/0259820 A1   Sep. 14, 2017

(30) Foreign Application Priority Data
Sep. 11, 2014 (JP) ................................ 2014-184932

(51) Int. Cl.
*B60W 30/165* (2020.01)
*G08G 1/00* (2006.01)
(Continued)

(52) U.S. Cl.
CPC ......... *B60W 30/165* (2013.01); *G05D 1/0027* (2013.01); *G05D 1/0088* (2013.01);
(Continued)

(58) Field of Classification Search
None
See application file for complete search history.

(56) References Cited

U.S. PATENT DOCUMENTS

| | | | |
|---|---|---|---|
| 8,838,321 B1* | 9/2014 | Ferguson | ............. G05D 1/0289 701/23 |
| 2013/0046421 A1* | 2/2013 | El Fassi | .................. B61L 3/127 701/2 |
| 2014/0297090 A1 | 10/2014 | Ichinose | |

FOREIGN PATENT DOCUMENTS

| | | |
|---|---|---|
| JP | 64-017107 A | 1/1989 |
| JP | 07-019882 A | 1/1995 |

(Continued)

OTHER PUBLICATIONS

Office Action dated Sep. 26, 2017 issued over the corresponding Japanese Patent Application No. 2016-547716 with the English translation of the pertinent portion.

*Primary Examiner* — Lail A Kleinman
(74) *Attorney, Agent, or Firm* — Carrier Blackman & Associates, P.C.; Joseph P. Carrier; Jeffrey T. Gedeon

(57) ABSTRACT

Provided is a driving assistance device capable of responding to situations in which an obstacle to automatic driving (which can include remote control driving) occurs in a situation other than when parking a vehicle in a garage. This driving assistance device has a peripheral environment detection unit that detects peripheral environment information, which is information pertaining to the environment around a vehicle, and an automatic driving control unit that, on the basis of the peripheral environment information, controls automatic driving wherein the vehicle is made to travel without involving driving operations by an occupant. When it is determined that automatic driving based on the peripheral environment information is not possible, the automatic driving control unit continues, by means of remote control, the automatic driving without involving driving operations by the occupant.

8 Claims, 8 Drawing Sheets

(51) Int. Cl.
*G05D 1/02* (2020.01)
*G06K 9/00* (2006.01)
*G05D 1/00* (2006.01)

(52) U.S. Cl.
CPC ....... *G05D 1/0293* (2013.01); *G06K 9/00805* (2013.01); *G08G 1/22* (2013.01); *B60W 2555/00* (2020.02); *G05D 2201/0213* (2013.01); *G06K 9/00791* (2013.01)

(56) References Cited

FOREIGN PATENT DOCUMENTS

| | | |
|---|---|---|
| JP | 09-282599 A | 10/1997 |
| JP | 2000-112523 A | 4/2000 |
| JP | 2000-331299 A | 11/2000 |
| JP | 2004-206275 A | 7/2004 |
| JP | 2007-334765 A | 12/2007 |
| JP | 2014-011518 A | 1/2014 |
| JP | 2014-058229 A | 4/2014 |
| JP | 2014-133444 A | 7/2014 |
| WO | 2013/069147 A1 | 5/2013 |
| WO | 2013/069147 A1 | 4/2015 |

\* cited by examiner

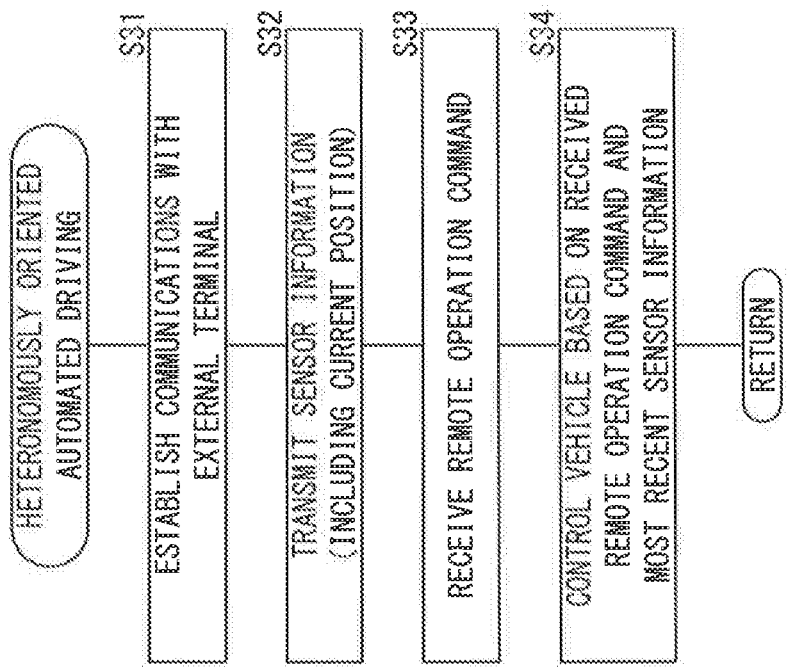

DRIVING ASSISTANCE DEVICE

TECHNICAL FIELD

The present invention relates to a driving assistance device that implements automated driving.

BACKGROUND ART

Japanese Laid-Open Patent Publication No. 2007-334765 (hereinafter referred to as "JP 2007-334765 A") has the object of providing a remote operation device for a vehicle for remotely operating or performing automated driving that does not pose an inconvenience to the driver (paragraph [0006], abstract). In order to accomplish this object, the remote operation device 1 of JP 2007-334765 A is provided with a travel route storage means 230 in which a travel route for the vehicle is stored, a monitoring device 240 that monitors the periphery of a travel position of the vehicle, and a vehicle travel control means 220, which controls the vehicle so as to travel on the travel route stored by the travel route storage means 230, in a first state when the monitoring device 240 is operating normally, and controls the vehicle so as to travel on the travel route stored by the travel route storage means 230, in a second state responsive to an abnormal condition when the monitoring device 240 is operating abnormally (abstract).

As the abnormal condition referred to above, in an operative example 1, a malfunction of the monitoring device 240 (camera) at a time of parking in a garage is cited (step S102 of FIG. 4, paragraph [0052]). If a malfunction of the camera has occurred (step S102: YES), a vehicle 3 is decelerated (step S103, paragraphs [0054] and [0058]). In other words, the aforementioned second state is a decelerating state of the vehicle 3.

Further, in an operative example 2, an abnormality (steering failure) of a steering control unit 20 or a steering device 20a at the time of parking in a garage is cited (paragraphs [0063] and [0065]). If an abnormality has occurred in the steering control unit 20 or the steering device 20a (step S202 of FIG. 5: YES), the vehicle 3 is stopped (S203). In such a state, if there is a command to start the vehicle (step S205: YES), the vehicle 3 is moved by only several tens of centimeters in an intermittent traveling mode (step S206, paragraph [0070]). Stated otherwise, the second state in the aforementioned operative example 2 is a state of intermittent traveling.

Moreover, intermittent traveling may be performed if a malfunction occurs in a monitoring device 30, and decelerated traveling may be performed if a malfunction occurs in the steering control unit 20 or the steering device 20a (paragraph [0074]).

SUMMARY OF INVENTION

As described above, with the device disclosed in JP 2007-334765 A, in the case that an abnormality occurs in the monitoring device 30 or the steering control unit 20, or in the steering device 20a during parking of the vehicle in a parking garage, decelerated traveling or intermittent traveling is carried out. However, according to JP 2007-334765 A, there is no mention concerning situations apart from when the vehicle is parked in a garage, or cases apart from the second state in which decelerated traveling and intermittent traveling are carried out.

The present invention has been devised taking into consideration the aforementioned problems, and has the object of providing a driving assistance device, which is capable of dealing with cases in which obstacles occur during automated driving (including the case of a remote control) aside from the case of parking the vehicle in a garage.

A driving assistance device according to the present invention is characterized by a surrounding environment detecting unit configured to detect surrounding environmental information, which is information in relation to a surrounding environment of a user's own vehicle, and an automated driving control unit configured to control automated driving in which the user's own vehicle is made to travel without intervention of a driving operation of a driver, based on the surrounding environmental information, wherein, in a case it is determined by the automated driving control unit that the automated driving based on the surrounding environmental information cannot be implemented, the automated driving control unit is configured to continue with the automated driving without intervention of the driving operation of the driver by remote control.

According to the present invention, in the case it is determined that automated driving cannot be implemented based on the surrounding environmental information, automated driving is continued by remote control without intervention of a driving operation of the driver. Consequently, in the case that automated driving cannot be implemented on the basis of the surrounding environmental information due to the occurrence of some type of obstacle, it is still possible for automated driving to be continued.

The automated driving control unit may be capable of selecting between an autonomously oriented type of automated driving in which a degree of dependence on an external device, with respect to acquisition of information necessary for the automated driving without intervention of a driving operation of the driver, is relatively low, and a heteronomously oriented type of automated driving in which the degree of dependence is relatively high, and the automated driving control unit may be configured to implement the autonomously oriented type of automated driving in a case it is determined that the autonomously oriented type of automated driving is capable of being implemented, and implement the heteronomously oriented type of automated driving by the remote control using wireless communications with the external device, in a case it is determined that the autonomously oriented type of automated driving cannot be implemented.

The automated driving control unit may be configured to carry out columnar traveling with respect to a preceding vehicle, which is recognized by the surrounding environment detecting unit, in the case it is determined that the automated driving based on the surrounding environmental information cannot be implemented, and the remote control may be implemented in accordance with information from the preceding vehicle. Consequently, even in the case that automated driving cannot be implemented based on the surrounding environmental information, automated driving can be continued in accordance with columnar traveling without intervention of a driving operation of the driver.

In the case it is determined that the automated driving based on the surrounding environmental information cannot be implemented, the automated driving control unit may be configured to transmit the surrounding environmental information to the external device, receive from the external device a remote operation command, which is input or set to the external device based on the surrounding environmental information, and implement the automated driving based on the remote operation command. In accordance with this feature, even in the case that automated driving cannot be implemented based on the surrounding environmental information, automated driving can be continued without intervention of a driving operation of the driver, but in accordance with the remote operation command, which is input or set on the basis of the surrounding environmental information in the external device.

After it has been determined that the automated driving based on the surrounding environmental information cannot be implemented, and in a case it is determined that the automated driving based on the surrounding environmental information is capable of being implemented, the automated driving control unit may be configured to restore, from the automated driving by the remote control, the automated driving based on the surrounding environmental information. In accordance with this feature, it is possible to suppress to the minimum degree necessary the occurrence of automated driving by remote control.

BRIEF DESCRIPTION OF DRAWINGS

FIG. 8 is a flowchart of heteronomously oriented automated driving according to the second embodiment.

DESCRIPTION OF EMBODIMENTS

A. First Embodiment
A1. Configuration
[A1-1. Overall Configuration]

Figure 1:
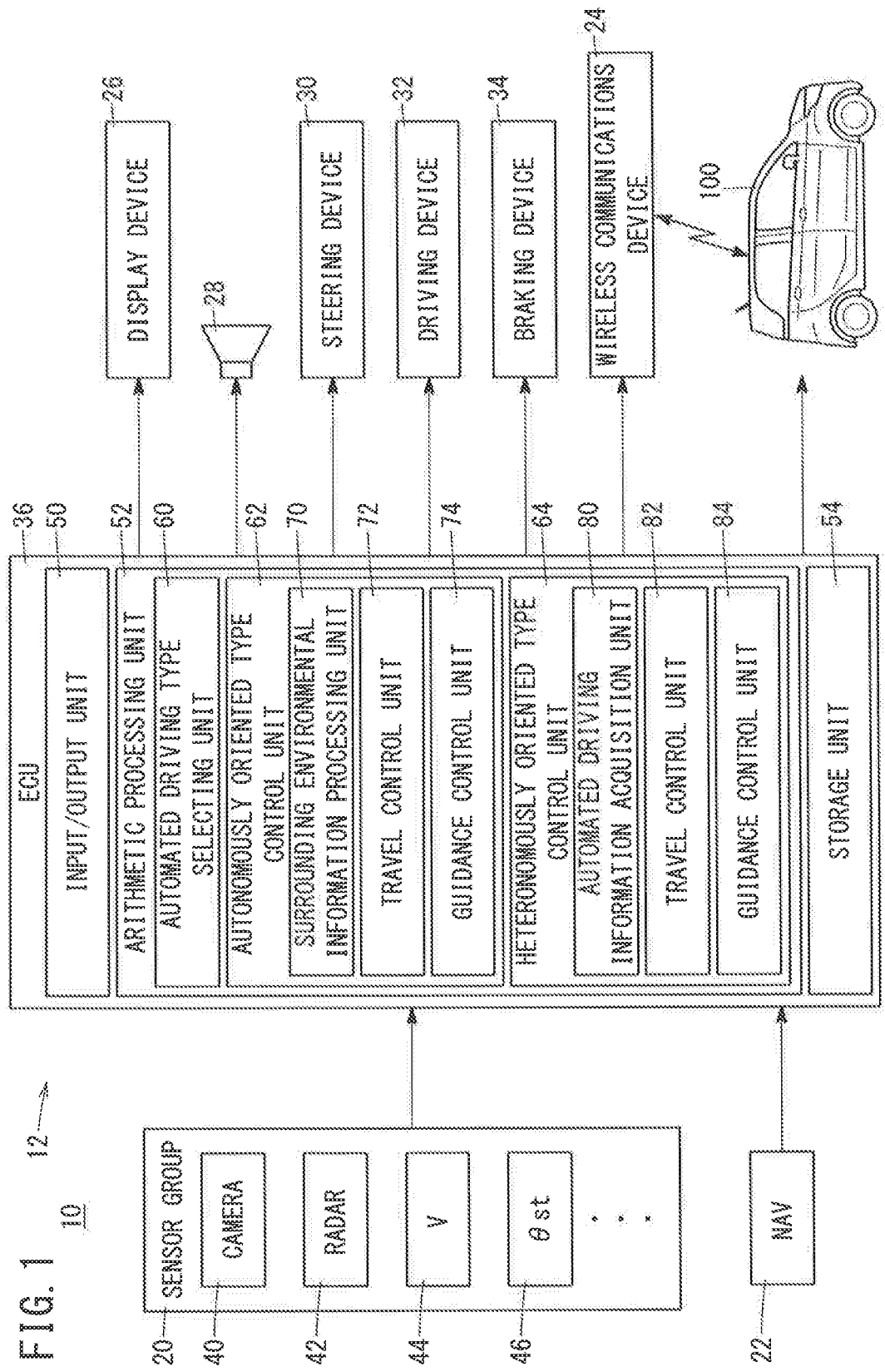
FIG. 1 is a block diagram showing the configuration of a vehicle (hereinafter also referred to as a "user's own vehicle") in which a driving assistance device according to a first embodiment of the present invention is incorporated.

FIG. 1 is a block diagram showing the configuration of a vehicle 10 (hereinafter also referred to as a "user's own vehicle 10") in which a driving assistance device 12 according to a first embodiment of the present invention is incorporated. The driving assistance device 12 includes a sensor group 20, a navigation device 22, a wireless communications device 24, a display device 26, a speaker 28, a steering device 30, a driving device 32, a braking device 34, and an electronic control device 36 (hereinafter referred to as an "ECU 36").

[A1-2. Sensor Group 20]
(A1-2-1. Outline of Sensor Group 20)

The sensor group 20 (surrounding environment detecting unit) includes, for example, a camera 40, a radar 42, a vehicle speed sensor 44, and a steering angle sensor 46. Other sensors apart therefrom, such as a wheel speed sensor, an acceleration sensor, and a revolution number sensor (RPM sensor) of a drive source (an engine, a traction motor, etc.), can also be included. The sensor group 20 including the camera 40 and the radar 42 functions as a surrounding environment detecting unit for detecting surrounding environmental information Ic, which is information concerning the environment surrounding the user's own vehicle 10.

(A1-2-2. Camera 40)

The camera 40 (image capturing means) acquires an image Pmc (hereinafter also referred to as a "peripheral image Pmc" or a "captured image Pmc") of the vicinity around the vehicle 10. In addition, a signal corresponding to the image Pmc (hereinafter also referred to as an "image signal Sic") is output to the ECU 36.

Although according to the present embodiment, only one camera 40 is used, a stereo camera may be constructed by arranging two cameras 40 with left/right symmetry. Alternatively, three or more cameras 40 can be used. Furthermore, in addition to or instead of capturing an image of the front of the vehicle 10, a camera 40 can also be used that captures an image of the rear and/or the sides of the vehicle 10.

The camera 40 acquires the image Pmc at a frame rate equal to or greater than 15 frames (e.g., 30 frames) per second. The camera 40 is a color camera, however, another type of camera may be used depending on the application. As the other camera, for example, a monochrome camera or an infrared camera using light having wavelengths mainly in the visible light region can be used. The camera 40, for example, is arranged in the center in the vehicle widthwise direction in a front portion in the interior of a vehicle cabin (for example, in the vicinity of the rear view mirror) of the vehicle 10. Alternatively, the camera 40 may be arranged in a central portion in the vehicle widthwise direction on a front bumper of the vehicle 10.

(A1-2-3. Radar 42)

The radar 42 outputs to the exterior of the vehicle 10 transmitted waves which are electromagnetic waves (in this case, millimeter waves), and receives reflected waves, which are reflected by detected objects (for example, other vehicles 100 and pedestrians) within the transmitted waves Wt and which are returned to the radar 42. In addition, a detection signal corresponding to the reflected waves (hereinafter referred to as a "reflected wave signal Swt") is output to the ECU 36.

The radar 42 is arranged on a front side (for example, on a front bumper and/or a front grill) of the vehicle 10. In addition to or instead of the front side, the radar 42 may be arranged on a rear side (for example, a rear bumper and/or a rear grill) or on a side (for example, a side of the front bumper) of the vehicle 10.

Further, instead of the radar 42 that outputs millimeter waves, a sensor such as a laser radar or an ultrasonic sensor or the like can be used.

(A1-2-4. Vehicle Speed Sensor 44 and Steering Angle Sensor 46)

The vehicle speed sensor 44 detects and outputs to the ECU 36a velocity V [km/h] of the vehicle 10. The steering angle sensor 46 detects a steering angle θst [deg] (for example, of a non-illustrated steering wheel) of the vehicle 10, and outputs the steering angle θst [deg] to the ECU 36.

[A1-3. Navigation Device 22]

The navigation device 22 detects the current position of the vehicle 10 using a GPS (Global Positioning System), and informs the user (occupant) of a route to the destination. The navigation device 22 includes a touch panel (not shown) that serves as an input device and a display device. The touch panel can be used for inputting the destination. Alternatively, the display device 26 may be a touch panel, and input of the destination may be input through the display device. Further, the navigation device 22 includes a storage device (not shown) in which map information is stored. The navigation device 22 detects or specifies the current position of the vehicle 10 based on geographical information from a GPS satellite, and the map information that is stored in the storage device. Concerning the feature of detecting the current position of the vehicle 10, the navigation device 22 can also be treated as a portion of the sensor group 20, or as one of the surrounding environment detection units.

In FIG. 1, although a type is assumed in which the navigation device 22 is attached to the vehicle 10, the present invention is not limited to this feature. Alternatively, a portable information terminal such as a smart phone or the like may be used as the navigation device 22. Further, the map information may be stored in an external server, and supplied as needed to the navigation device 22.

[A1-4. Wireless Communications Device 24]

The wireless communications device 24 communicates with another vehicle 100 exterior to the user's own vehicle 10, or an external device (for example, an optical beacon arranged on the roadside, or an external terminal or a server arranged in a remote location) apart from the other vehicle 100. In FIG. 1, although a type is assumed in which the wireless communications device 24 is attached to the vehicle 10, the present invention is not limited to this feature. Alternatively, a portable information terminal such as a smart phone or the like may be used as the wireless communications device 24.

[A1-5. Display Device 26 and Speaker 28]

The display device 26 performs a display in relation to automated driving. The display device 26, for example, may be configured as a portion of a meter of a non-illustrated instrument panel. Alternatively, the display device 26 may also be used in common as a display unit of the navigation device 22. The speaker 28 carries out an audio output (voice guidance, etc.) in relation to the automated driving. The speaker 28 may be configured as a portion of the navigation device 22 or a non-illustrated audio device.

[A1-6. Steering Device 30]

The steering device 30 switches the travel direction (steering angle θst) of the vehicle 10 based on a command or the like from the ECU 36. Moreover, with the vehicle 10 of the first embodiment, it is possible to switch between a normal driving mode in which driving is carried out by the driver operating a non-illustrated steering wheel, or an automated driving mode in which the driver does not operate the steering wheel. Therefore, the vehicle 10 is premised on being equipped with such a steering wheel. However, in the vehicle 10, only the automated driving mode can be enabled, and it is possible not to provide a steering wheel that is operated by the driver.

[A1-7. Driving Device 32]

The driving device 32 generates a driving force of the vehicle 10 based on a command or the like from the ECU 36. In the case that the vehicle 10 is an engine-equipped vehicle, the driving device 32, for example, includes an engine and a transmission, neither of which is shown. Alternatively, if the vehicle 10 is an electric vehicle (a battery operated vehicle) in the narrow sense, the driving device 32, for example, includes a traction motor and a transmission, neither of which is shown.

[A1-8. Braking Device 34]

The braking device 34 generates a braking force of the vehicle 10 based on a command or the like from the ECU 36. The braking device 34, for example, includes a brake disc, a brake caliper, and a hydraulic mechanism, none of which are shown. Further, in the case that the vehicle 10 is an electric vehicle equipped with a non-illustrated traction motor, the braking device 34 may include the traction motor in a portion thereof dedicated to regenerative braking. The electric vehicle referred to herein is not limited to an electric vehicle in the narrow sense, but may also include a hybrid vehicle, a fuel cell vehicle, or the like.

[A1-9. ECU 36]

The ECU 36 controls automated driving in the vehicle 10, and as shown in FIG. 1, includes an input/output unit 50, an arithmetic processing unit 52, and a storage unit 54. Communications between the ECU 36 and the various components (the sensor group 20, the navigation device 22, the wireless communications device 24, etc.) are carried out through the input/output unit 50. The input/output unit 50 is equipped with a non-illustrated A/D converting circuit for converting input analog signals into digital signals.

The arithmetic processing unit 52 performs calculations based on information input from the sensor group 20, the navigation device 22, and the wireless communications device 24. Based on the calculation results thereof, the arithmetic processing unit 52 generates and issues signals with respect to the wireless communications device 24, the display device 26, the speaker 28, the steering device 30, the driving device 32, and the braking device 34.

As shown in FIG. 1, the arithmetic processing unit 52 includes an automated driving type selecting unit 60 (hereinafter also referred to as a "selecting unit 60"), an autonomously oriented automated driving control unit 62 (hereinafter also referred to as a "control unit 62" or an "autonomously oriented type control unit 62"), and a heteronomously oriented automated driving control unit 64 (hereinafter also referred to as a "control unit 64" or a "heteronomously oriented type control unit 64"). The selecting unit 60 and the control units 62, 64, respectively, are realized by executing programs that are stored in the storage unit 54. Such programs may be supplied from the exterior through the wireless communications device 24 (including the case of a portable telephone, a smart phone, or the like). A portion of such programs can be constituted as hardware (circuit components).

The selecting unit 60 selects the type of automated driving. According to the first embodiment, as the types of automated driving, it is possible to select between autonomously oriented automated driving and heteronomously oriented automated driving. Autonomously oriented automated driving refers to an automated driving mode in which a dependence D on the external device is relatively low in relation to acquisition of the surrounding environmental information Ic, which is information concerning the surrounding environment around the user's own vehicle 10. Stated otherwise, autonomously oriented driving is an automated driving mode (with emphasis on standalone automated driving) in which emphasis is placed on processing that is performed in a standalone state in the user's own vehicle 10. Heteronomously oriented automated driving refers to an automated driving mode in which the dependence D is relatively high. Stated otherwise, heteronomously oriented driving is an automated driving mode (with emphasis on network-based automated driving) in which emphasis is placed on processing that is performed through a network between the user's own vehicle 10 and an external device. The external device referred to herein includes, for example, the other vehicle 100 or a device apart from a vehicle (for example, an external terminal or an external server).

The autonomously oriented type control unit 62 serves to control autonomously oriented automated driving, and includes a surrounding environmental information processing unit 70, a travel control unit 72, and a guidance control unit 74. The surrounding environmental information processing unit 70 acquires the surrounding environmental information Ic required for autonomously oriented automated driving. Corresponding to the surrounding environmental information Ic acquired by the surrounding environmental information processing unit 70, the travel control unit 72 controls the steering angle θst by the steering device 30, the driving force by the driving device 32, and the braking force by the braking device 34. The guidance control unit 74 shows the vehicle occupant through the display device 26 and the speaker 28 information in relation to the autonomously oriented automated driving (for example, the time required to reach the destination).

The heteronomously oriented type control unit 64 serves to control heteronomously oriented automated driving, and includes an automated driving information acquisition unit 80, a travel control unit 82, and a guidance control unit 84. The automated driving information acquisition unit 80 acquires information (hereinafter referred to as "automated driving information Ia") required to carry out heteronomously oriented automated driving. The automated driving information Ia can include a portion of the surrounding environmental information Ic used during autonomously oriented automated driving. Corresponding to the automated driving information Ia acquired by the automated driving information acquisition unit 80, the travel control unit 82 controls the steering angle θst by the steering device 30, the driving force by the driving device 32, and the braking force by the braking device 34. The guidance control unit 84 shows the vehicle occupant through the display device 26 and the speaker 28 information in relation to the heteronomously oriented automated driving.

The storage unit 54 stores various programs and data such as control programs used by the arithmetic processing unit 52. The storage unit 54 is constituted by a RAM (Random Access Memory) for temporarily storing image signals that are converted into digital signals, and data, etc., used for various computational processes, and a ROM (Read Only Memory) for storing executable programs, tables, and maps, etc.

A2. Various Control Processes

[A2-1. Selection of Automated Driving Type]

Figure 2:
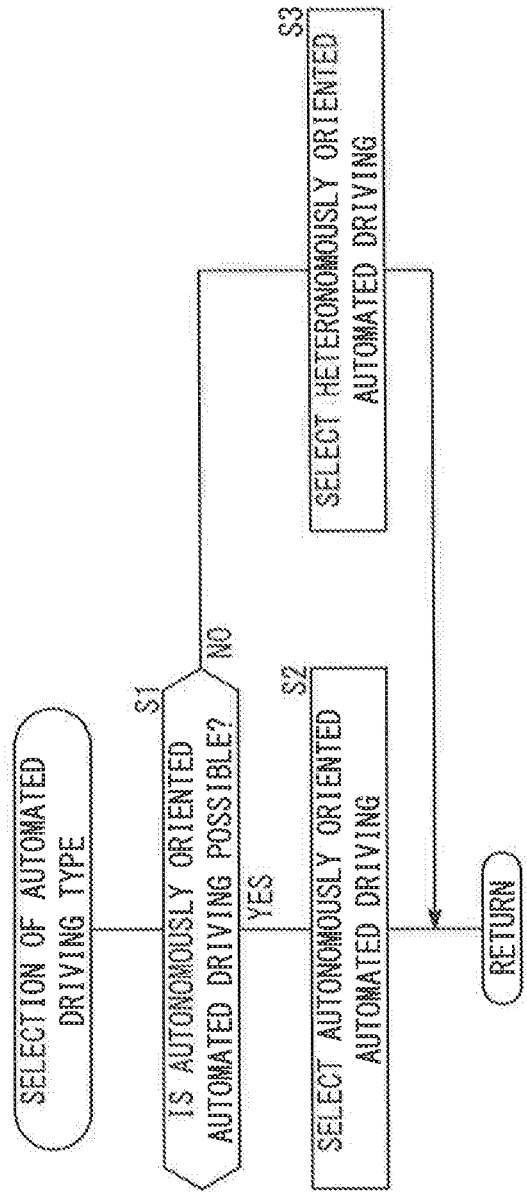
FIG. 2 is a flowchart of a process for selecting a type of automated driving in the first embodiment.

FIG. 2 is a flowchart of a process for selecting a type of automated driving according to the first embodiment. In step S1 to step S3 of FIG. 2, the automated driving type selecting unit 60 of the ECU 36 is executed at a predetermined computation cycle (for example, at any of several milliseconds to several hundred milliseconds). In the foregoing manner, according to the first embodiment, as the types of automated driving, autonomously oriented automated driving and heteronomously oriented automated driving are used.

In step S1, the ECU 36 determines whether or not autonomously oriented automated driving is possible (or in other words, whether or not autonomously oriented automated driving cannot be performed). In such a determination, as to the reason why autonomously oriented automated driving cannot be performed, for example, one or more of the following situations can be used.

(a1) The current position of the vehicle 10 cannot be specified due to a deterioration in the reception state (or sensitivity) of the navigation device 22.

Figure 3:
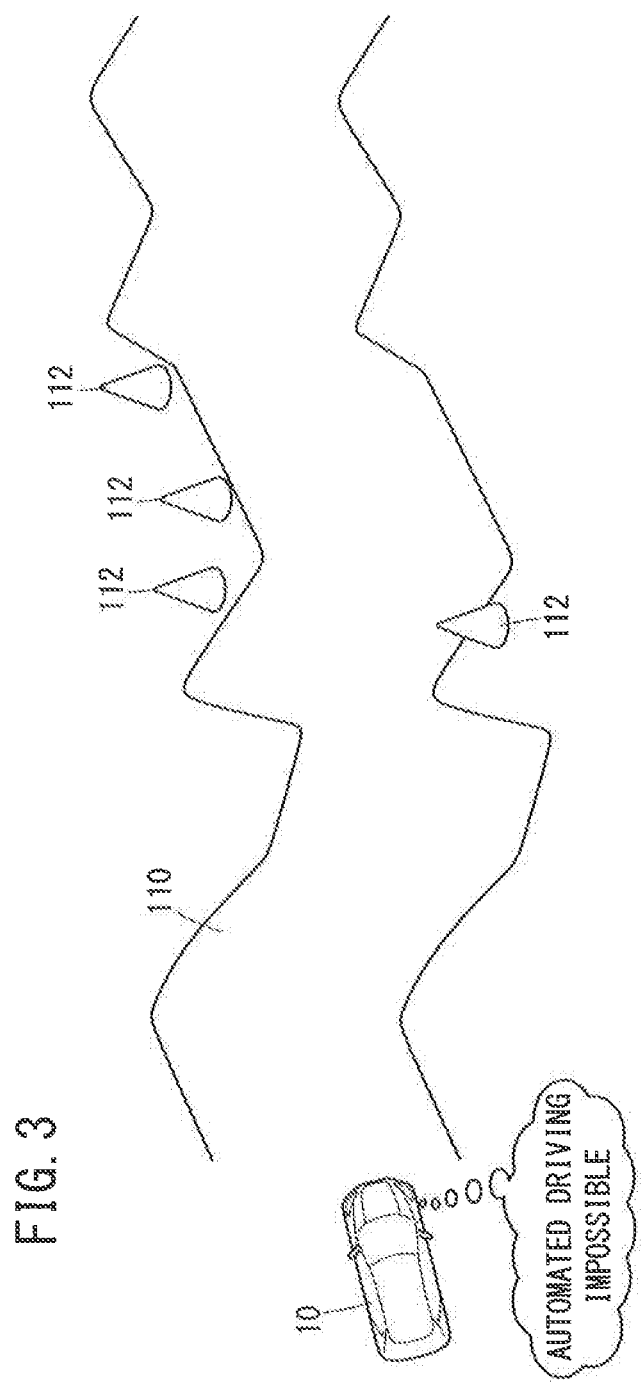
FIG. 3 is a diagram showing a state in which the vehicle cannot implement autonomously oriented automated driving according to the first embodiment.

(a2) The direction of travel cannot be specified with only the user's own vehicle 10, because one or more obstacles 112 (including the case of another vehicle 100) exist which are difficult to avoid on a travel path 110 of the user's own vehicle 10 (see FIG. 3).

(a3) It is impossible to detect the travel lane (for example, white lines), because the travel path 110 of the user's own vehicle 10 is a road that is not paved or properly maintained.

(a4) The travel path 110 of the user's own vehicle 10 is a curved road having a radius of curvature less than or equal to a predetermined radius of curvature, and thus it is not possible to calculate parameters (such as target values for the steering angle θst) that allow the user's own vehicle 10 to travel.

(a5) It is not possible to detect the travel lane or obstacles 112 or to judge traffic signals or signs, because the detection accuracy of the camera 40 becomes deteriorated due to weather conditions such as heavy rain, fog, etc.

(a6) It is not possible to detect the driving lane or obstacles 112 or to judge traffic signals or signs, because the camera 40 has failed.

(a7) Obstacles 112 cannot be detected because a malfunction has occurred in the radar 42.

In the case of the aforementioned items (a1) to (a7), the ECU 36, for example, may set judgment threshold values, and can determine whether autonomously oriented automated driving is possible due to a relationship with the judgment threshold values.

In the case that autonomously oriented automated driving is possible (step S1 of FIG. 2: YES), then in step S2, the ECU 36 selects autonomously oriented automated driving. On the other hand, in the case that autonomously oriented automated driving is not possible (step S1: NO), then in step S3, the ECU 36 selects heteronomously oriented automated driving.

As described above, the ECU 36 repeats the processes of FIG. 2 in predetermined computation cycles. Therefore, in the case that autonomously oriented driving becomes possible (step S1: YES) while heteronomously oriented automated driving is being implemented, the ECU 36 switches from heteronomously oriented automated driving to autonomously oriented automated driving.

[A2-2. Autonomously Oriented Automated Driving]

(A2-2-1. Processing of Surrounding Environmental Information Ic)

(A2-2-1-1. Outline)

The ECU 36 (surrounding environmental information processing unit 70) processes for the purpose of automated driving the surrounding environmental information Ic acquired from the sensor group 20 and the navigation device 22, or acquired from the exterior via the wireless communications device 24. Compared to the case when the heteronomously oriented automated driving is selected, with autonomously oriented automated driving, a greater amount of the surrounding environmental information Ic detected by the vehicle 10 itself is used. On the other hand, in the case of selecting heteronomously oriented automated driving, a greater amount of information acquired from the external device (or the other vehicle 100) via the wireless communications device 24 is used.

When autonomously oriented automated driving is performed, the ECU 36 processes the surrounding environmental information Ic in order to obtain one or more of the following items of information, for example.

(b1) The current position of the user's own vehicle 10

(b2) The direction of travel of the user's own vehicle 10

(b3) The travel lane of the user's own vehicle 10

(b4) A planned travel path for the user's own vehicle 10

(b5) The legal vehicle speed of the current travel path 110 of the user's own vehicle 10

(b6) A recommended vehicle speed of the current travel path 110 of the user's own vehicle 10

(b7) Obstacles 112 (including other vehicles 100) in the vicinity of the user's own vehicle 10 (particularly in the direction of travel)

(b8) The state of traffic signals in the travel path 110 of the user's own vehicle 10

(b9) The content of signs in the travel path 110 of the user's own vehicle 10

(A2-2-1-2. Details of Processing the Surrounding Environmental Information Ic)

During autonomously oriented automated driving, the various types of information described above are acquired in the following manner based on the surrounding environmental information Ic. More specifically, the current position of the user's own vehicle 10 is detected, for example, using a detection value from the navigation device 22 (GPS). Alternatively, if it is difficult for GPS to be used, such as during driving through a tunnel, an inertial navigation system may be used. The direction of travel of the user's own vehicle 10 is determined based on changes in the current position of the user's own vehicle 10, for example. Detection of the travel lane for the user's own vehicle 10 is carried out, for example, by detecting white lines indicative of the travel lane from the peripheral image Pmc of the camera 40. Alternatively, if road position identifiers such as coils are embedded along the travel path 110, the travel lane can be detected using such road position identifiers.

For example, information from the navigation device 22 is used as the planned travel path for the user's own vehicle 10. Further, for example, information from the navigation device 22 is used as the legal vehicle speed for the current travel path 110 of the user's own vehicle 10. Alternatively, in the case that optical beacons are installed in the vicinity of the travel path 110, the ECU 36 may determine the legal vehicle speed based on information from such optical beacons. Alternatively, the ECU 36 may detect from the peripheral image Pmc of the camera 40 road signs that indicate the legal vehicle speed, and can determine the legal vehicle speed based on such road signs. Alternatively, the current position of the user's own vehicle 10 may be transmitted to an external server (not shown) in which map information is stored, and the legal vehicle speed corresponding to the current position may be acquired from the external server. Similarly, a recommended vehicle speed for the current travel path 110 of the user's own vehicle 10 can be acquired, for example, from the navigation device 22, the optical beacons, or the external server. The recommended vehicle speed referred to herein is a recommended vehicle speed that takes into consideration areas where accidents tend to occur frequently, weather conditions (snowfall, rainfall, etc.) and the like, which can be set separately from the legal vehicle speed.

Obstacles 112 (including other vehicles 100) in the vicinity of the user's own vehicle 10 (in particular, in the direction of travel thereof) are determined, for example, using at least one item of the surrounding environmental information Ic from the camera 40 and the radar 42. The states of traffic signals (for example, any of red, green and yellow) in the travel path 110 of the user's own vehicle 10 are determined, for example, based on the peripheral image Pmc from the camera 40 or information from optical beacons. The contents of traffic signs in the travel path 110 of the user's own vehicle 10 are determined using at least one of the peripheral image Pmc from the camera 40, information from optical beacons, and information from the navigation device 22, for example.

In the above-described manner, in the surrounding environmental information Ic, there are included information from the navigation device 22 (the current position of the user's own vehicle 10, the scheduled travel path, the legal vehicle speed, traffic signs), the peripheral image Pmc of the camera 40, road position identifiers, information from the optical beacons (the legal vehicle speed, traffic signs), and detection results from the radar 42.

Moreover, any one or a plurality of the surrounding environmental information Ic and the above items (b1) to (b9) can be acquired from the other vehicle 100 that exists in the vicinity of the user's own vehicle 10.

(A2-2-2. Control of Traveling During Autonomously Oriented Automated Driving)

The ECU 36 carries out the travel control by using the aforementioned various information (items (b1) to (b9)) acquired by processing the surrounding environmental information Ic and the detection values (for example, the vehicle speed V, the steering angle θst) from the sensor group 20. Corresponding to the surrounding environmental information Ic acquired by the surrounding environmental information processing unit 70, in the travel control the steering angle θst by the steering device 30, and the driving force by the driving device 32 or the braking force by the braking device 34 are controlled.

[A2-3. Heteronomously Oriented Automated Driving]

(A2-3-1. Outline)

Figure 4:
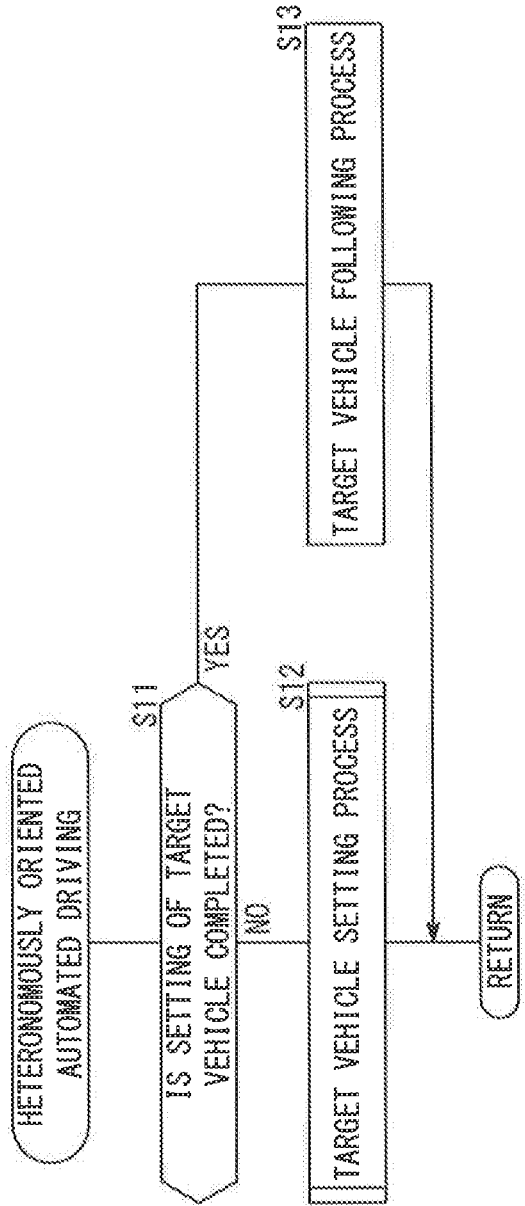
FIG. 4 is a flowchart of heteronomously oriented automated driving according to the first embodiment.
Figure 5:
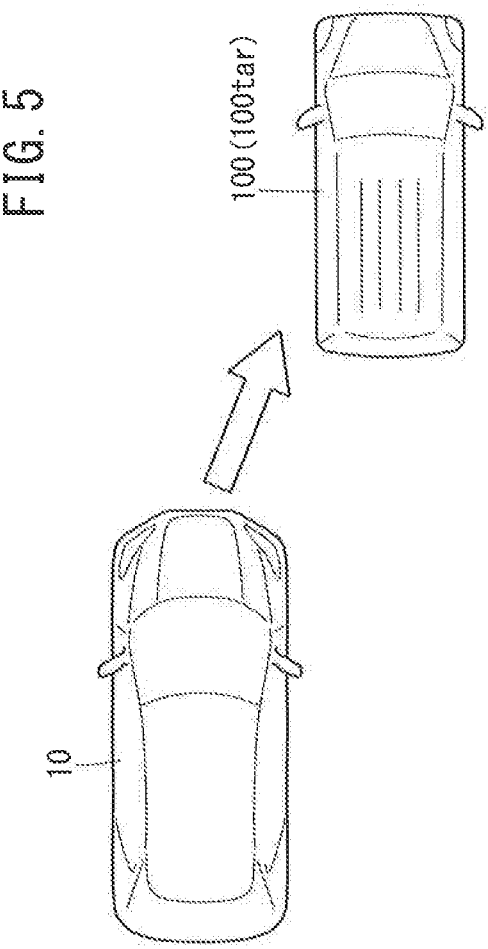
FIG. 5 is a view showing a situation during heteronomously oriented automated driving of the first embodiment, when another vehicle as a target vehicle is followed by the user's own vehicle.

FIG. 4 is a flowchart of heteronomously oriented automated driving according to the first embodiment. FIG. 5 is a view showing a situation during heteronomously oriented automated driving of the first embodiment, when the user's own vehicle 10 starts to follow another vehicle 100 as a target vehicle 100tar. In step S11 to step S13 of FIG. 4, the heteronomously oriented type control unit 64 is executed by a program at a predetermined computation cycle (for example, at any of several milliseconds to several hundred milliseconds).

In step S11 of FIG. 4, the ECU 36 determines whether or not setting of the target vehicle 100tar has been completed. If setting of the target vehicle 100tar has not been completed (step S11: NO), then in step S12, the ECU 36 executes a target vehicle setting process for setting the target vehicle 100tar (details of which will be described later with reference to FIG. 6). Until the target vehicle 100tar is set, the ECU 36 may cause a hazard lamp (not shown) of the vehicle 10 to blink. Consequently, even if communications are not carried out between the other vehicle 100 and the user's own vehicle 10, the attention of the driver of the other vehicle 100 can be drawn to the existence of the user's own vehicle 10, and as a result, the blinking of the hazard lamp can serve as a trigger for initiation of columnar traveling of the user's own vehicle 10 with respect to the other vehicle 100.

If setting of the target vehicle 100tar has been completed (step S11: YES), then in step S13, the ECU 36 executes a target vehicle following process for causing the user's own vehicle 10 to follow the target vehicle 100tar. In the target vehicle following process, while communicating with the target vehicle 100tar via the wireless communications device 24, the ECU 36 receives from the target vehicle 100tar information that is necessary to enable the target vehicle 100tar to be followed (for example, one or more of the steering angle θst, the vehicle speed V, the wheel speed, and the current position of the target vehicle 100tar). Moreover, at this time, the surrounding environmental information Ic (for example, the peripheral image Pmc for the purpose of determining obstacles 112) can be acquired and used independently by the user's own vehicle 10 itself.

Alternatively, the ECU 36 may control the steering device 30, the driving device 32, and the braking device 34, so as to maintain a relative distance to the target vehicle 100tar at a constant value or within a fixed range based on the peripheral image Pmc from the camera 40. Alternatively, the ECU 36 is also capable of following the target vehicle 100tar using the processes described in Japanese Laid-Open Patent Publication No. 2000-112523 or Japanese Laid-Open Patent Publication No. 2000-331299.

(A2-3-2. Details of Target Vehicle Setting Process)

Figure 6:
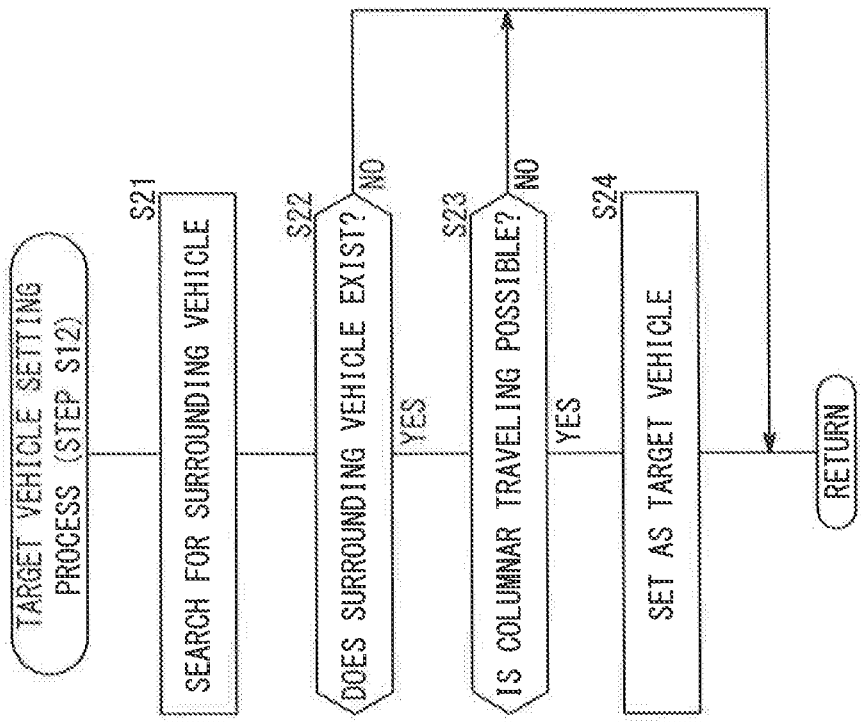
FIG. 6 is a flowchart (details of step S12 of FIG. 4) of a target vehicle setting process according to the first embodiment.

FIG. 6 is a flowchart (details of step S12 of FIG. 4) of a target vehicle setting process according to the first embodiment. In step S21, the ECU 36 searches for the other vehicle 100 (hereinafter also referred to as a "surrounding vehicle 100") that exists in the vicinity around the user's own vehicle 10. For example, the ECU 36 outputs a calling signal in the vicinity of the user's own vehicle 10 via the wireless communications device 24.

In step S22, the ECU 36 determines whether or not there is a surrounding vehicle 100. For example, upon receiving the response signal to the calling signal, the ECU 36 determines the existence of a surrounding vehicle 100. If there is a surrounding vehicle 100 present in the vicinity (step S22: YES), then in step S23, the ECU 36 determines whether or not it is possible to carry out columnar traveling with respect to the surrounding vehicle 100. For example, the ECU 36 determines whether or not columnar traveling is possible in accordance with whether or not the respective routes of the user's own vehicle 10 and the surrounding vehicle 100 are in the same direction. In this instance, the surrounding vehicle 100 may be a vehicle in which driving by the driver is being performed (a vehicle in which automated driving is not being performed).

If columnar traveling is possible (step S23: YES), then in step S24, the ECU 36 sets the surrounding vehicle 100 as the target vehicle 100tar and begins following the target vehicle 100tar(see FIG. 5). If there is no surrounding vehicle 100 (step S22: NO) or if columnar traveling cannot be carried out (step S23: NO), the current process is brought to an end, and the routine proceeds to step S1 of FIG. 2.

Alternatively, if there is no surrounding vehicle 100 (step S22: NO) or if columnar traveling cannot be carried out (step S23: NO), the process may transition to a remote control (i.e., a remote control via an external terminal 202) according to a second embodiment (see FIG. 8), as will be described later.

A3. Advantages of the First Embodiment

As described above, according to the first embodiment, in the case it is determined that automated driving (autonomously oriented automated driving) cannot be implemented based on the surrounding environmental information Ic (step S1 of FIG. 2: NO), automated driving (heteronomously oriented automated driving) is continued by remote control and not through a driving operation of the driver (step S3 of FIG. 2, and FIG. 4). Consequently, in the case that the autonomously oriented type of automated driving cannot be implemented due to the occurrence of some kind of obstacle, it is still possible for automated driving to be continued. Assuming it is allowed by law, even when traveling with only an occupant without driving qualifications (a child, or someone who has been drinking alcohol), it is possible to travel to the destination point with greater reliability.

According to the first embodiment, the ECU 36 (automated driving control unit) carries out columnar traveling (see FIG. 5) with respect to the target vehicle 100tar (preceding vehicle), which is recognized by the heteronomously oriented type control unit 64 (surrounding environment detecting unit), in the case it is determined that automated driving (autonomously oriented automated driving) on the basis of the surrounding environmental information Ic cannot be implemented (step S1 of FIG. 2: NO), and the user's own vehicle 10 is remotely controlled from the target vehicle 100tar (step S13 of FIG. 4). In the foregoing manner, even in the case that the autonomously oriented type of automated driving cannot be implemented, automated driving can be continued in accordance with columnar traveling and not through a driving operation of the driver.

According to the first embodiment, the ECU 36 (automated driving control unit) returns to the autonomously oriented automated driving (step S2) from the heteronomously oriented automated driving (automated driving by remote control) (step S3), in the case it is determined that automated driving (autonomously oriented automated driving) can be implemented (step S1: YES), after it has been determined (step S1 of FIG. 2: NO) that automated driving (autonomously oriented automated driving) cannot be implemented on the basis of the surrounding environmental information Ic. In accordance with this feature, it is possible to suppress to the minimum degree necessary the occurrence of automated driving by remote control.

B. Second Embodiment

B1. Configuration (Differences from First Embodiment)

Figure 7:
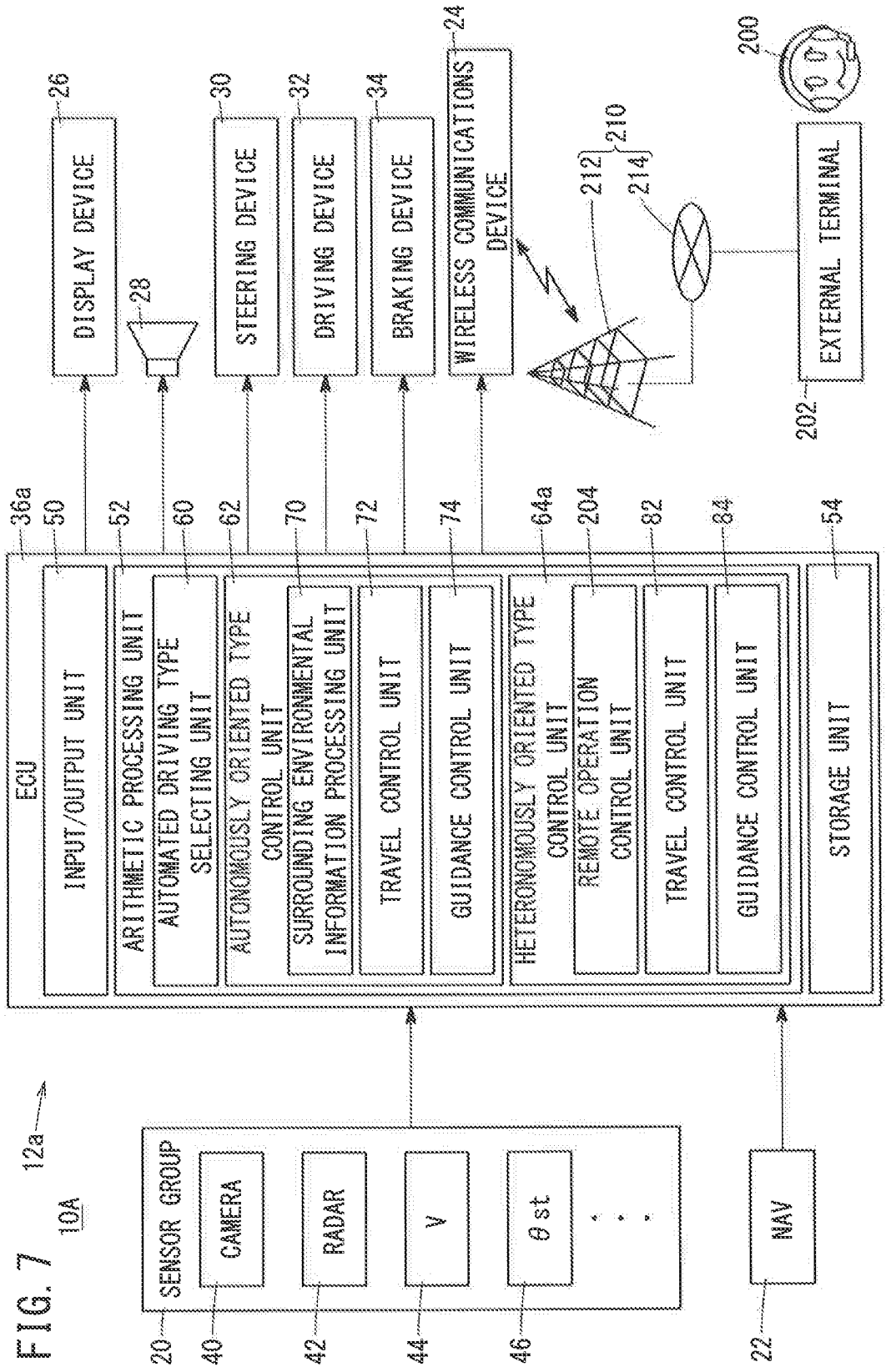
FIG. 7 is a block diagram showing the configuration of a vehicle in which a driving assistance device according to a second embodiment of the present invention is incorporated.

FIG. 7 is a block diagram showing the configuration of a vehicle 10A (hereinafter also referred to as a "user's own vehicle 10A") in which a driving assistance device 12a according to a second embodiment of the present invention is incorporated. Reference characters in relation to constituent elements that are the same in the first embodiment and the second embodiment are denoted by the same reference characters, and detailed description of such features is omitted.

When heteronomously oriented automated driving is carried out (FIG. 1), the vehicle 10 of the first embodiment follows the target vehicle 100tar(FIGS. 4 and 5). In contrast thereto, with the vehicle 10A according to the second embodiment (FIG. 7), when heteronomously oriented automated driving is carried out, automated driving is performed on the basis of a remote operation command which is input by an operator 200 to the external terminal 202.

The heteronomously oriented automated driving control unit 64a (hereinafter also referred to as a "control unit 64a" or a "heteronomously oriented type control unit 64a") of an electronic control device 36a (hereinafter referred to as an "ECU 36a") of the second embodiment includes a remote operation control unit 204 instead of the automated driving information acquisition unit 80 of the first embodiment.

The remote operation control unit 204 communicates with the external terminal 202 through the wireless communications device 24 and a communications network 210 (including a repeater 212 and the Internet 214), and receives remote operation commands. When communications with the external terminal 202 are carried out, the remote operation control unit 204 transmits to the external terminal 202 the detection values acquired by the sensor group 20, and the current position of the user's own vehicle 10A acquired by the navigation device 22 (hereinafter referred to collectively as "sensor information Is").

Further, in the case that a sound collecting sensor (a microphone or the like) for collecting sounds outside of the vehicle is included in the sensor group 20, the detection results of the sound collecting sensor may also be used as a portion of the sensor information Is. In accordance with this feature, the operator 200 who carries out remote operations can be notified, on the basis of the detection results from the sound collecting sensor, of the presence or absence of an emergency vehicle or a dangerous approaching object in the vicinity of the vehicle 10A.

B2. Various Control Processes

[B2-1. Outline (Differences from First Embodiment)]

In the second embodiment, the selection between the types of automated driving (FIG. 2) and the control during implementation of autonomously oriented automated driving are the same as in the first embodiment. In accordance with the heteronomously oriented automated driving of the first embodiment, the target vehicle 100*tar* is followed (see FIGS. 4 and 5). However, according to the heteronomously oriented automated driving of the second embodiment, automated driving is performed on the basis of the remote operation command, which is input by the operator 200 to the external terminal 202 (see FIG. 7).

[B2-2. Heteronomously Oriented Automated Driving]

FIG. 8 is a flowchart of heteronomously oriented automated driving according to the second embodiment. In step S31, the ECU 36*a* establishes communications with the external terminal 202 via the wireless communications device 24 and the communications network 210. For example, the ECU 36*a* outputs a response request signal to the external terminal 202. The external terminal 202, which has received the response request signal, outputs a ring tone, and then waits for a response from the operator 200.

Communications are established in the event that a specified operator 200 responds to the ring tone.

In step S32, the ECU 36*a* transmits sensor information Is (including the current position of the user's own vehicle 10A) to the external terminal 202. The external terminal 202, which has received the sensor information Is, displays the sensor information Is on a non-illustrated display device. Consequently, for example, the peripheral image Pmc from the camera 40 is displayed on the display device, whereby the operator 200 can recognize the situation surrounding the user's own vehicle 10A. In addition, based on the sensor information Is, the operator 200 inputs a remote operation command to the external terminal 202. Stated otherwise, the external terminal 202 receives a remote operation command from the operator 200. The external terminal 202, which has received the remote operation command, transmits the remote operation command to the vehicle 10A (ECU 36*a*).

In step S33, the ECU 36*a* receives the remote operation command. Then, in step S34, the ECU 36*a* controls the vehicle 10A based on the received remote operation command and the most recent sensor information Is at that time (more specifically, automated driving of vehicle 10A is carried out).

B3. Advantages of the Second Embodiment

According to the second embodiment, as described above, the following effects can be obtained in addition to or in place of those of the first embodiment.

More specifically, according to the second embodiment, the arithmetic processing unit 52 of the ECU 36*a* (automated driving control unit) transmits (step S32 of FIG. 8) the sensor information Is (surrounding environmental information Ic) to the external terminal 202 (external device), in the case it is determined that autonomously oriented automated driving (automated driving on the basis of the surrounding environmental information Ic) cannot be implemented (step S1 of FIG. 2: NO). In addition, based on the sensor information Is from the external terminal 202, the ECU 36*a* receives a remote operation command, which is input or set to the external terminal 202 (step S33). Furthermore, the ECU 36*a* carries out automated driving on the basis of the remote operation command (step S34).

In accordance with this feature, even in the case that autonomously oriented automated driving cannot be implemented, automated driving can be continued not through a driving operation of the driver, but in accordance with the remote operation command, which is input or set on the basis of the sensor information Is in the external terminal 202 (external device).

C. Modifications

The present invention is not limited to the above embodiments, but various arrangements may be adopted based on the disclosed content of the present specification. For example, the following arrangements may be adopted.

C1. Object to Which the Invention is Applied

According to the above-described embodiments, although the driving assistance devices 12, 12*a* are applied to a vehicle 10, 10A (see FIGS. 1 and 7), respectively, the invention is not limited to this feature and may be applied to other objects. For example, the driving assistance devices 12, 12*a* can be used in mobile objects such as ships and aircraft, etc. Alternatively, the driving assistance devices 12, 12*a* may be applied to robots, manufacturing equipment, or home appliances.

C2. External Terminal 202 (External Device)

According to the second embodiment, a configuration has been described in which the operator 200 uses the external terminal 202, which is installed in a specified facility as an external device that remotely controls the vehicle 10A (see FIG. 7). However, from the standpoint of remotely operating the user's own vehicles 10, 10A in accordance with surrounding environmental information Ic (the peripheral image Pmc, etc.) that is transmitted from the user's own vehicles 10, 10A, the invention is not limited to this feature. For example, an external server may be provided for processing the surrounding environmental information Ic transmitted from the user's own vehicles 10, 10A without the presence of the operator 200, and transmitting commands for remote operation to the vehicle 10, 10A. Alternatively, the functions of such an external server can be possessed by the other vehicle 100.

C3. Controls of ECUs 36, 36*a*

In the first embodiment, an example of columnar traveling with the target vehicle 100*tar* has been described (see FIGS. 4 and 5), whereas in the second embodiment, an example of remote control from the external terminal 202 has been described (see FIGS. 7 and 8). However, for example, from the standpoint of switching between autonomously oriented automated driving (a standalone emphasized type of automated driving) and heteronomously oriented automated driving (a network emphasized type of automated driving), the invention is not limited to this feature. For example, columnar traveling with the target vehicle 100*tar* and remote control from the external terminal 202 can also be combined. In the case of such a combination, for example, it is possible to carry out remote control from the external terminal 202 in relation to columnar traveling with the target vehicle 100*tar*, if the answer to step S22 is NO or the answer to step S23 is NO in FIG. 6.

The invention claimed is:

1. A driving assistance device, comprising:
    a surrounding environment detecting unit configured to detect surrounding environmental information, which is information in relation to a surrounding environment of a user's own vehicle; and an automated driving control unit configured to control automated driving in which the user's own vehicle is made to travel without intervention of a driving operation of a driver, based on the surrounding environmental information;

wherein the automated driving control unit is configured to select between an autonomously oriented type of automated driving and a heteronomously oriented type of automated drive, and a degree of dependence on an external device in the autonomously oriented type of automated driving is lower than that in the heteronomously oriented type of automated driving, and the degree of dependence on the external device being a degree of dependence on the external device with respect to acquisition of information necessary for the automated driving without intervention of the driving operation of the driver; and the automated driving control unit is configured to:

implement the autonomously oriented type of automated driving, in a case it is determined that the autonomously oriented type of automated driving is capable of being implemented;

output a calling signal to the surrounding environment of the user's own vehicle through a wireless communications device, and determine whether columnar traveling is capable of being implemented based on information from a surrounding vehicle which has output a response signal in response to the calling signal, in a case it is determined that the autonomously oriented type of automated driving cannot be implemented;

implement the columnar traveling based on information from the surrounding vehicle, in a case it is determined that the columnar traveling can be implemented and implement the heteronomously oriented type of automated driving by remote control using wireless communications with the external device in a case it is determined that the columnar traveling cannot be implemented, and the automated driving control unit includes a remote operation control unit configured to transmit, to the external device, a sound outside of the user's own vehicle collected by a sound collecting sensor mounted on the user's own vehicle to the external device when the heteronomously oriented type of automated driving is implemented.

2. The driving assistance device according to claim 1, wherein, in the case it is determined that the automated driving based on the surrounding environmental information cannot be implemented, the automated driving control unit is configured to:

transmit the surrounding environmental information to the external device;

receive from the external device a remote operation command, which is input or set to the external device based on the surrounding environmental information; and implement the automated driving based on the remote operation command.

3. The driving assistance device according to claim 1, wherein, after it has been determined that the automated driving based on the surrounding environmental information cannot be implemented, and in a case it is determined that the automated driving based on the surrounding environmental information is capable of being implemented, the automated driving control unit is configured to restore, from the automated driving by the remote control, the automated driving based on the surrounding environmental information.

4. The driving assistance device according to claim 1, wherein the automated driving control unit is configured to receive a remote operation command input or set to the external device based on the sound outside the user's own vehicle and implement the automated driving based on the remote operation command.

5. A driving assistance device comprising:

a surrounding environment detecting unit configured to detect surrounding environmental information, which is information in relation to a surrounding environment of a user's own vehicle; and an automated driving control unit configured to control automated driving in which the user's own vehicle is made to travel without intervention of the driving operation of a driver, based on the surrounding environmental information;

wherein the automated driving control unit is configured to:

output a calling signal to the surrounding environment of the user's own vehicle through a wireless communications device, and determine whether columnar traveling is capable of being implemented based on information from a surrounding vehicle which has output a response signal in response to the calling signal, in a case where the automated driving control unit determines that the automated driving based on the surrounding environmental information cannot be implemented;

implement the columnar traveling based on information from the surrounding vehicle, in a case it is determined that the columnar traveling can be implemented; and implement an automated driving by remote control using wireless communications with an external device, in a case it is determined that the columnar traveling cannot be implemented, and wherein the automated driving control unit includes a remote operation control unit configured to transmit, to the external device, a sound outside of the user's own vehicle collected by a sound collecting sensor mounted on the user's own vehicle, in a case where the automated driving control unit implements the automated driving by remote control using wireless communications with the external device.

6. The driving assistance device according to claim 5, wherein, in the case it is determined that the automated driving based on the surrounding environmental information cannot be implemented, the automated driving control unit is configured to:

transmit the surrounding environmental information to the external device;

receive from the external device a remote operation command, which is input or set to the external device based on the surrounding environmental information; and implement the automated driving based on the remote operation command.

7. The driving assistance device according to claim 5, wherein, after it has been determined that the automated driving based on the surrounding environmental information cannot be implemented, and in a case it is determined that the automated driving based on the surrounding environmental information is capable of being implemented, the automated driving control unit is configured to restore, from the automated driving by the remote control, the automated driving based on the surrounding environmental information.

8. The driving assistance device according to claim 5, wherein the automated driving control unit configured to receive a remote operation command input or set to the external device based on the sound outside the user's own vehicle and implement the automated driving based on the remote operation command.

* * * * *